United States Patent [19]

Felder et al.

[11] Patent Number: 5,208,131
[45] Date of Patent: May 4, 1993

[54] DEGRADABLE RESINS FOR ELECTROSTATIC LIQUID DEVELOPERS

[75] Inventors: Thomas C. Felder, Wilmington; Thomas M. Ford, Greenville, both of Del.

[73] Assignee: DXIMaging, Lionville, Pa.

[21] Appl. No.: 820,012

[22] Filed: Jan. 10, 1992

Related U.S. Application Data

[63] Continuation of Ser. No. 552,386, Jul. 13, 1990, abandoned.

[51] Int. Cl.⁵ .............................................. G03G 9/08
[52] U.S. Cl. ................................... 430/115; 430/114; 430/137; 430/904
[58] Field of Search .............. 430/115, 114, 137, 904

[56] References Cited

U.S. PATENT DOCUMENTS

| | | | |
|---|---|---|---|
| 4,965,128 | 10/1990 | Greidanus et al. | 428/372 |
| 4,994,341 | 2/1991 | Adair et al. | 430/115 |
| 5,004,664 | 4/1991 | Fuller et al. | 430/106 |

Primary Examiner—Marion E. McCamish
Assistant Examiner—S. Rosasco

[57] ABSTRACT

Electrostatic liquid developer consisting essentially of
(A) nonpolar liquid having Kauri-butanol value less than 30, present in major amount,
(B) particles, average by area particle size of less than 10 μm, of a degradable polymeric resin as defined, and
(C) nonpolar liquid soluble ionic or zwitterionic charge director compound.

Optionally a colorant and an adjuvant compound are present. Process of preparation of electrostatic liquid developers is described. The developer is useful in copying, making proofs including digital color proofs, lithographic printing plates, and resists. The developer particles can be readily removed from the printed material, such as paper, by degradation of the polymer. If the polymeric resin is depolymerized, the monomer and low molecular weight units can be recycled by being repolymerized, or discarded in a landfill as a biodegradable environmentally benign by-product.

39 Claims, No Drawings

DEGRADABLE RESINS FOR ELECTROSTATIC LIQUID DEVELOPERS

This is a continuation of application Ser. No. 07/552,386 filed Jul. 13, 1990, now abandoned.

TECHNICAL FIELD

This invention relates to an electrostatic liquid developer having improved properties. More particularly this invention relates to an electrostatic liquid developer containing a degradable polymeric resin.

BACKGROUND ART

It is known that a latent electrostatic image can be developed with toner particles dispersed in an insulating nonpolar liquid. Such dispersed materials are known as liquid toners or liquid developers. A latent electrostatic image may be produced by providing a photoconductive layer with a uniform electrostatic charge and subsequently discharging the electrostatic charge by exposing it to a modulated beam of radiant energy. Other methods are known for forming latent electrostatic images. For example, one method is providing a carrier with a dielectric surface and transferring a preformed electrostatic charge to the surface. Useful liquid developers comprise a thermoplastic resin in particle form and dispersant nonpolar liquid. Generally a suitable colorant is present such as a dye or pigment. The colored toner particles are dispersed in the nonpolar liquid which generally has a high-volume resistivity in excess of $10^9$ ohm centimeters, a low dielectric constant below 3.0 and a high vapor pressure. The toner particles are less than 10 μm average particle size as measured by a Malvern 3600E laser diffraction light scattering particle analyzer. After the latent electrostatic image has been formed, the image is developed by the colored toner particles dispersed in said dispersant nonpolar liquid and the image may subsequently be transferred to a carrier sheet.

Since the formation of proper images depends on the differences of the charge between the liquid developer and the latent electrostatic image to be developed, it has been found desirable to add a charge director compound and preferably an adjuvant, e.g., polyhydroxy compound, aminoalcohol, polybutylene succinimide, an aromatic hydrocarbon, etc. to the liquid developer comprising the thermoplastic resin, nonpolar liquid and preferably the colorant.

Because of environmental concerns, recycling of used paper is becoming ever more important. However, paper printed with toners has been found to be unacceptable for making recycled paper because the toner printing contaminates the recycled paper product. Toners are particularly difficult to remove from paper because the resin is melt-fused and so very tightly bonded. Even after de-inking (removal of toner), the residual toner imparts to recycled paper a gray cast and also a black spotted appearance.

SUMMARY OF THE INVENTION

In accordance with this invention there is provided an electrostatic liquid developer having improved degradability compatible with recycling of printed paper, consisting essentially of (A) a nonpolar liquid having a Kauri-butanol value of less than 30, present in a major amount, (B) particles of a degradable polymeric resin containing at least one hydroxy acid unit selected from the group consisting of
(1) $(O(CR^1R^2)_nCO)_p$
(2) $(OCR^1R^2COOCR^1R^2CO)_q$
(3) $(OCR^1R^2CR^1R^2OCR^1R^2CO)_r$ and
(4) $(OCR^1R^2CR^1R^2OCR^1R^2CR^1R^2CO)_s$ wherein n is a whole number 2, 4 or 5, the total of p, q, r and s being 15 to 5,000, and $R^1$ or $R^2$, which can be the same or different, is hydrogen, hydrocarbyl containing 1 to 12 carbon atoms, or substituted hydrocarbyl containing 1 to 12 carbon atoms, the resin particles having an average by area particle size of less than 10 μm, and (C) a nonpolar liquid soluble ionic or zwitterionic charge director compound.

In accordance with a further embodiment of this invention there is provided a process for the preparation of toner particles for electrostatic liquid developers comprising A. dispersing at an elevated temperature in a vessel a degradable polymeric resin containing at least one hydroxy acid unit selected from the group consisting of
(1) $(O(CR^1R^2)_nCO)_p$
(2) $(OCR^1R^2COOCR^1R^2CO)_q$
(3) $(OCR^1R^2CR^1R^2OCR^1R^2CO)_r$ and
(4) $(OCR^1R^2CR^1R^2OCR^1R^2CR^1R^2CO)_s$ wherein n is a whole number 2, 4 or 5, the total of p, q, r and s being 15 to 5,000, and $R^1$ or $R^2$, which can be the same or different, is hydrogen, hydrocarbyl containing 1 to 12 carbon atoms, or substituted hydrocarbyl containing 1 to 12 carbon atoms, and a nonpolar liquid having a Kauri-butanol value of less than 30, by means of moving particulate media whereby the moving particulate media creates shear and/or impact, while maintaining the temperature in the vessel at a temperature sufficient to plasticize and liquify the resin and below that at which the nonpolar liquid boils and the resin decomposes, B. cooling the dispersion in said vessel to permit precipitation of the resin out of the dispersant, the particulate media being maintained in continuous movement during and subsequent to cooling whereby toner particles having an average by area particle size of less than 10 μm are formed, and C. separating the dispersion of toner particles from the particulate media.

Throughout the specification the below-listed terms have the following meanings:

In the claims appended hereto "consisting essentially of" means the composition of the electrostatic liquid developer does not exclude unspecified components which do not prevent the advantages of the developer from being realized. For example, in addition to the primary components, there can be present additional components, such as fine particle size oxides, adjuvant, e.g., polyhydroxy compound, aminoalcohol, polybutylene succinimide, metallic soap, aromatic hydrocarbon, etc.

Degradable means that the polymeric acid resin component of the developer is biodegradable, for example in landfills, but more importantly is hydrolyzable by exposure to aqueous conditions, preferably slightly basic or acidic, whereupon the polymeric resin is hydrolyzed to monomeric or low molecular weight units that are suitable for recycle reuse to prepare polymer.

Aminoalcohol means that there is both an amino functionality and hydroxyl functionality in one compound.

Conductivity is the conductivity of the developer measured in picomhos (pmho)/cm at 5 hertz and 5 volts.

The dispersant nonpolar liquids (A) are, preferably, branched-chain aliphatic hydrocarbons and more particularly, Isopar®-G, Isopar®-H, Isopar®-K, Isopar®-L, Isopar®-M and Isopar®-V. These hydrocarbon liquids are narrow cuts of isoparaffinic hydrocarbon fractions with extremely high levels of purity. For example, the boiling range of Isopar®-G is between 157° C. and 176° C., Isopar®-H between 176° C. and 191° C., Isopar®-K between 177° C. and 197° C., Isopar®-L between 188° C. and 206° C. and Isopar®-M between 207° C. and 254° C. and Isopar®-V between 254.4° C. and 329.4° C. Isopar®-L has a mid-boiling point of approximately 194° C. Isopar®-M has a flash point of 80° C. and an auto-ignition temperature of 338° C. Stringent manufacturing specifications, such as sulphur, acids, carboxyl, and chlorides are limited to a few parts per million. They are substantially odorless, possessing only a very mild paraffinic odor. They have excellent odor stability and are all manufactured by the Exxon Corporation. High-purity normal paraffinic liquids, Norpar®12, Norpar®13 and Norpar®15, Exxon Corporation, may be used. These hydrocarbon liquids have the following flash points and auto-ignition temperatures:

| Liquid | Flash Point (°C.) | Auto-Ignition Temp (°C.) |
|---|---|---|
| Norpar ® 12 | 69 | 204 |
| Norpar ® 13 | 93 | 210 |
| Norpar ® 15 | 118 | 210 |

All of the nonpolar liquids have an electrical volume resistivity in excess of $10^9$ ohm centimeters and a dielectric constant below 3.0. The vapor pressures at 25° C. are less than 10 Torr. Isopar®-G has a flash point, determined by the tag closed cup method, of 40° C., Isopar®-H has a flash point of 53° C. determined by ASTM D 56. Isopar®-L and Isopar®-M have flash points of 61° C., and 80° C., respectively, determined by the same method. While these are the preferred nonpolar liquids, the essential characteristics of all suitable nonpolar liquids are the electrical volume resistivity and the dielectric constant. In addition, a feature of the nonpolar liquids is a low Kauri-butanol value less than 30, preferably in the vicinity of 27 or 28, determined by ASTM D 1133. The ratio of resin to dispersant nonpolar liquid is such that the combination of ingredients becomes fluid at the working temperature. The nonpolar liquid is present in an amount of 50 to 99.9% by weight, preferably 97 to 99.5% by weight, based on the total weight of liquid developer. The total weight of solids in the liquid developer is 0.1 to 50%, preferably 0.3 to 3.0% by weight. The total weight of solids in the liquid developer is solely based on the resin, including components dispersed therein, e.g., pigment component, adjuvant, etc.

The degradable polymeric resin contains at least one hydroxy acid unit selected from the group consisting of
(1) $(O(CR^1R^2)_nCO)_p$
(2) $(OCR^1R^2COOCR^1R^2CO)_q$
(3) $(OCR^1R^2CR^1R^2OCR^1R^2CO)_r$ and
(4) $(OCR^1R^2CR^1R^2OCR^1R^2CR^1R^2CO)_s$ wherein n is a whole number 2, 4 or 5, the total of p, q, r and s being 15 to 5,000, and $R^1$ or $R^2$, which can be the same or different, is hydrogen, hydrocarbyl containing 1 to 12 carbon atoms, or substituted hydrocarbyl containing 1 to 12 carbon atoms.

Preferred units are those in which $R^1$ and $R^2$ each are hydrogen or methyl, and especially preferred units are epsilon-caprolactone, gamma-valerolactone, lactide(3,6-dimethyl-1,4-dioxan-2,5-dione), glycolid(1,4-dioxan-2,5-dione), 1,5-dioxepan-2-one, 1,4-dioxan-2-one, beta-butyrolactone, and beta-propiolactone. Mixtures of these units can be used.

The polymeric resin can be homopolymer of any of units (1) to (4), block or random copolymer of at least 2 units of (1) to (4), blends of homopolymers of any of units (1) to (4), block or random copolymers of at least two units of (1) to (4), and combinations thereof.

In addition, the degradable resins have the following preferred characteristics:
1. Are able to disperse a colorant, e.g., pigment, etc.
2. Are substantially insoluble in the dispersant liquid at temperatures below 40° C., so that the resin will not dissolve or solvate in storage,
3. Are able to be ground to form particles between 0.1 $\mu$m and 5 $\mu$m, average by area size (preferred size), e.g., determined by Horiba CAPA-500 centrifugal automatic particle analyzer, manufactured by Horiba Instruments, Inc., Irvine, Calif.; and between 1 $\mu$m and 15 $\mu$m, in diameter, e.g., determined by Malvern 3600E Particle Sizer described below.
4. Are able to form a particle size (average by area) of less than 10 $\mu$m, e.g., determined by Horiba CAPA-500 centrifugal automatic particle analyzer, solvent viscosity of 1.24 cps, solvent density of 0.76 g/cc, sample density of 1.32 using a centrifugal rotation of 1,000 rpm, a particle size range of 0.01 to less than 10 $\mu$m, and a particle size cut of 1.0 $\mu$m, and, about 30 $\mu$m average particle size. e.g., determined by Malvern 3600E Particle Sizer as described below,
5. Are able to fuse at temperatures in excess of 70° C.

The Malvern 3600E Particle Sizer manufactured by Malvern, Southborough, Mass. which uses laser diffraction light scattering of stirred samples to determine average particle sizes. Since the Horiba and Malvern instruments use different techniques to measure average particle size the readings differ. The following correlation of the average size of toner particles in micrometers ($\mu$m) for the two instruments is:

| Value Determined By Malvern 3600E Particle Sizer | Expected Range for Horiba CAPA-500 |
|---|---|
| 30 | 9.9 + 3.4 |
| 20 | 6.4 + 1.9 |
| 15 | 4.6 + 1.3 |
| 10 | 2.8 + 0.8 |
| 5 | 1.0 + 0.5 |
| 3 | 0.2 + 0.6 |

This correlation is obtained by statistical analysis of average particle sizes for 67 liquid electrostatic developer samples (not of this invention) obtained on both instruments. The expected range of Horiba values was determined using a linear regression at a confidence level of 95%. In the claims appended to this specification the particle size values are as measured using the Horiba instrument.

Suitable nonpolar liquid soluble ionic or zwitterionic charge director compounds (C), which are generally used in an amount of 0.25 to 1,500 mg/g, preferably 2.5 to 400 mg/g developer solids, include: anionic glyceride such as Emphos ® D70-30C, Emphos ®F 27-85, two commercial products sold by Witco Corp., New York, N.Y.; which are sodium salts of phosphated mono- and diglycerides with unsaturated and saturated acid substituents, respectively; lecithin, Basic Barium Petronate ®, Neutral Barium Petronate ®, Calcium Petronate ®, Neutral Calcium Petronate ®, oil-soluble petroleum sulfonates, Witco Corp., New York, N.Y.; and metallic soaps such as aluminum tristearate, aluminum distearate; barium, calcium, lead and zinc stearates; cobalt, manganese, lead and zinc linoleates, aluminum, calcium and cobalt octoates; calcium and cobalt oleates; zinc palmitate; calcium, cobalt, manganese, iron, lead and zinc naphthenates; calcium, cobalt, manganese, lead and zinc resinates, etc.

As indicated above, additional components that can be present in the electrostatic liquid developer are colorants, such as pigments or dyes and combinations thereof, which are preferably present to render the latent image visible, though this need not be done in some applications. The colorant, e.g., a pigment, may be present in the amount of up to about 60 percent by weight based on the total weight of developer solids, preferably 0.01 to 30% by weight based on the total weight of developer solids. The amount of colorant may vary depending on the use of the developer. Examples of pigments include:

PIGMENT LIST

| Pigment Brand Name | Manufacturer | Colour Index Pigment |
| --- | --- | --- |
| Permanent Yellow DHG | Hoechst | Yellow 12 |
| Permanent Yellow GR | Hoechst | Yellow 13 |
| Permanent Yellow G | Hoechst | Yellow 14 |
| Permanent Yellow NCG-71 | Hoechst | Yellow 16 |
| Permanent Yellow GG | Hoechst | Yellow 17 |
| Hansa Yellow RA | Hoechst | Yellow 73 |
| Hansa Brilliant Yellow 5GX-02 | Hoechst | Yellow 74 |
| Dalamar ® Yellow YT-858-D | Heubach | Yellow 74 |
| Hansa Yellow X | Hoechst | Yellow 75 |
| Novoperm ® Yellow HR | Hoechst | Yellow 83 |
| Chromophtal ® Yellow 3G | Ciba-Geigy | Yellow 93 |
| Chromophtal ® Yellow GR | Ciba-Geigy | Yellow 95 |
| Novoperm ® Yellow FGL | Hoechst | Yellow 97 |
| Hansa Brilliant Yellow 10GX | Hoechst | Yellow 98 |
| Lumogen ® Light Yellow | BASF | Yellow 110 |
| Permanent Yellow G3R-01 | Hoechst | Yellow 114 |
| Chromophtal ® Yellow 8G | Ciba-Geigy | Yellow 128 |
| Irgazin ® Yellow 5GT | Ciba-Geigy | Yellow 129 |
| Hostaperm ® Yellow H4G | Hoechst | Yellow 151 |
| Hostaperm ® Yellow H3G | Hoechst | Yellow 154 |
| L74-1357 Yellow | Sun Chem. | Yellow 14 |
| L75-1331 Yellow | Sun Chem. | Yellow 17 |
| L75-2337 Yellow | Sun Chem. | Yellow 83 |
| Hostaperm ® Orange GR | Hoechst | Orange 43 |
| Paliogen ® Orange | BASF | Orange 51 |
| Irgalite ® Rubine 4BL | Ciba-Geigy | Red 57:1 |
| Quindo ® Magenta | Mobay | Red 122 |
| Indofast ® Brilliant Scarlet | Mobay | Red 123 |
| Hostaperm ® Scarlet GO | Hoechst | Red 168 |
| Permanent Rubine F6B | Hoechst | Red 184 |
| Monastral ® Magenta | Ciba-Geigy | Red 202 |
| Monastral ® Scarlet | Ciba-Geigy | Red 207 |
| Heliogen ® Blue L 6901F | BASF | Blue 15:2 |
| Heliogen ® Blue NBD 7010 | BASF | Blue:3 |
| Heliogen ® Blue K 7090 | BASF | Blue 15:3 |
| Heliogen ® Blue L 7101F | BASF | Blue 15:4 |
| Paliogen ® Blue L 6470 | BASF | Blue 60 |
| Heliogen ® Green K 8683 | BASF | Green 7 |
| Heliogen ® Green L 9140 | BASF | Green 36 |
| Monastral ® Violet R | Ciba-Geigy | Violet 19 |

-continued
PIGMENT LIST

| Pigment Brand Name | Manufacturer | Colour Index Pigment |
| --- | --- | --- |
| Monastral ® Red B | Ciba-Geigy | Violet 19 |
| Quindo ® Red R6700 | Mobay | Violet 19 |
| Quindo ® Red R6713 | Mobay | |
| Indofast ® Violet | Mobay | Violet 23 |
| Monastral ® Violet Maroon B | Ciba-Geigy | Violet 42 |
| Sterling ® NS Black | Cabot | Black 7 |
| Sterling ® NSX 76 | Cabot | |
| Tipure ® R-101 | Du Pont | White 6 |
| Mogul L | Cabot | Black, CI 77266 |
| Uhlich ® BK 8200 | Paul Uhlich | Black (Blackness Index 153) |

Other ingredients may be added to the electrostatic liquid developer, such as fine particle size oxides, e.g., silica, alumina, titania, etc.; preferably in the order of 0.5 μm or less can be dispersed into the liquefied resin. These oxides can be used instead of the colorant or in combination with the colorant. Metal particles may also be added.

Another additional component of the electrostatic liquid developer is an adjuvant selected from the group consisting of polyhydroxy compound which contains at least 2 hydroxy groups, aminoalcohol, polybutylene succinimide, metallic soap, and aromatic hydrocarbon having a Kauri-butanol value of greater than 30. The adjuvants are generally used in an amount of 1 to 1000 mg/g, preferably 1 to 200 mg/g developer solids. Examples of the various above-described adjuvants include:

polyhydroxy compounds: ethylene glycol, 2,4,7,9-tetramethyl-5-decyn-4,7-diol, poly(propylene glycol), pentaethylene glycol, tripropylene glycol, triethylene glycol, glycerol, pentaerythritol, glycerol-tri-12 hydroxystearate, ethylene glycol monohydroxystearate, propylene glycerol monohydroxy-stearate, etc. as described in Mitchell U.S. Pat. No. 4,734,352.

aminoalcohol compounds: triisopropanolamine, triethanolamine, ethanolamine, 3-amino-1- propanol, o-aminophenol, 5-amino-1-pentanol, tetra(2-hydroxyethyl)ethylenediamine, etc. as described in Larson U.S. Pat. No. 4,702,985.

polybutylene succinimide: OLOA ®-1200 sold by Chevron Corp., analysis information appears in Kosel U.S. Pat. No. 3,900,412, column 20, lines 5 to 13, incorporated herein by reference; Amoco 575 having a number average molecular weight of about 600 (vapor pressure osmometry) made by reacting maleic anhydride with polybutene to give an alkenylsuccinic anhydride which in turn is reacted with a polyamine. Amoco 575 is 40 to 45% surfactant, 36% aromatic hydrocarbon, and the remainder oil, etc. These adjuvants are described in El-Sayed and Taggi U.S. Pat. No. 4,702,984.

metallic soap: aluminum tristearate; aluminum distearate; barium, calcium, lead and zinc stearates; cobalt, manganese, lead and zinc linoleates; aluminum, calcium and cobalt octoates; calcium and cobalt oleates; zinc palmitate; calcium cobalt, manganese, lead and zinc naphthenates; calcium, cobalt, manganese, lead and zinc resinates; etc. The metallic soap is dispersed in the thermoplastic resin as described in Trout U.S. Pat. Nos. 4,707,429 and 4,740,444.

aromatic hydrocarbon: benzene, toluene, naphthalene, substituted benzene and naphthalene compounds, e.g., trimethylbenzene, xylene, dimethylethylbenzene, ethylmethylbenzene, propylbenzene, Aromatic 100 which is a mixture of $C_9$ and $C_{10}$ alkyl-substituted benzenes manufactured by Exxon Corp., etc. as described in Mitchell U.S. Pat. No. 4,631,244.

organic sulfur-containing compounds: sulfonic acid, organic sulfonates, organic sulfate, sulfinic acid and salts thereof as described in column 5, line 7, to column 6, line 20 of El-Sayed and Trout U.S. Pat. No. 4,917,985.

The disclosures of the above-listed U.S. patents describing the adjuvants are incorporated herein by reference.

The particles in the electrostatic liquid developer have an average by area particle size of less than 10 $\mu$m as measured by the Horiba CAPA-500 centrifugal automatic particle analyzer described above, preferably the average by area particle size is less than 5 $\mu$m. The resin particles of the developer may or may not be formed having a plurality of fibers integrally extending therefrom. The term "fibers" as used herein means pigmented toner particles formed with fibers, tendrils, tentacles, threadlets, fibrils, ligaments, hairs, bristles, or the like.

The electrostatic liquid developer can be prepared by a variety of processes. For example, into a suitable mixing or blending vessel, e.g., attritor, heated ball mill, heated vibratory mill such as a Sweco Mill (manufactured by Sweco Co., Los Angeles, Calif.), equipped with particle media for dispersing and grinding, or mixing and blending equipment which requires no particulate media such as a Ross double planetary mixer (manufactured by Charles Ross and Son, of Hauppauge, N.Y.), Banbury mixer, single-screw extruder, double-screw extruder, heated two roll mill, etc., are placed the resin, and, if desired, dispersant nonpolar liquid described above. Generally the resin, nonpolar liquid and optional colorant are placed in the vessel prior to starting the dispersing step. Optionally the colorant can be added after homogenizing the resin and the nonpolar liquid. Polar additive can also be present in the vessel, e.g., up to 100% by weight based on the weight polar additive and nonpolar liquid (total liquid). The dispersing step is generally accomplished at elevated temperature, i.e., the temperature of ingredients in the vessel being sufficient to plasticize and liquefy the resin but being below that at which the nonpolar liquid or polar additive, if present, degrades and the resin and/or colorant decomposes. A preferred temperature range is 80° to 185° C. Other temperatures outside this range may be suitable, however, depending on the particular ingredients used. The presence of the irregularly moving particulate media in the vessel is preferred to prepare the dispersion of toner particles. Other stirring means can be used as well, however, to prepare dispersed toner particles of proper size, configuration and morphology. Useful particulate media are particulate materials, e.g., spherical, cylindrical, etc. selected from the group consisting of stainless steel, carbon steel, alumina, ceramic, zirconia, silica, and sillimanite. Carbon steel particulate media is particularly useful when colorants other than black are used. A typical diameter range for the particulate media is in the range of 0.04 to 0.5 inch (1.0 to ~13 mm).

After dispersing the ingredients in the vessel, with or without a polar additive present until the desired dispersion is achieved, typically 1 hour with the mixture being fluid, the dispersion is cooled, e.g., in the range of 0° C. to 50° C. Cooling may be accomplished, for example in the same vessel, such as the attritor. Additional liquid may be added at any step during the preparation of the liquid electrostatic developer to facilitate grinding or to dilute the developer to the appropriate % solids needed for toning. Additional liquid means nonpolar liquid, polar liquid, or combinations thereof. Cooling is accomplished by means known to those skilled in the art and is not limited to cooling by circulating cold water or a cooling material through an external cooling jacket adjacent the dispersing apparatus or permitting the dispersion to cool to ambient temperature. The resin precipitates out of the dispersant or solidifies during the cooling.

A desirable cooling step (B) technique is to cool the dispersion, either.

(1) without stirring to form a gel or solid mass, followed by shredding or pulverizing the gel or solid mass and grinding by means of particulate media with or without the presence of additional liquid; or (2) with stirring to form a viscous mixture and grinding by means of particulate media with or without the presence of additional liquid; or (3) while grinding by means of particulate media to prevent the formation of a gel or solid mass with or without the presence of additional liquid.

Toner particles of average particle size (by area) of less than 10 $\mu$m, as determined by an Horiba CAPA-5000 centrifugal particle analyzer described above or other comparable apparatus, are formed by grinding for a relatively short period of time.

After cooling and separating the dispersion of toner particles from the particulate media, if present, by means known to those skilled in the art, it is possible to reduce the concentration of the toner particles in the dispersion, impart an electrostatic charge of predetermined polarity to the toner particles, or a combination of these variations. The concentration of the toner particles in the dispersion is reduced by the addition of additional nonpolar liquid as described previously above. The dilution is normally conducted to reduce the concentration of toner particles to between 0.1 to 50 percent by weight, preferably 0.3 to 3.0, and more preferably 0.5 to 2 weight percent with respect to the nonpolar liquid. One or more nonpolar liquid soluble ionic or zwitterionic charge director compounds (C), of the type set out above, can be added to impart an electrostatic charge. The addition may occur at any time during the process; preferably at the end of the process, e.g., after the particulate media, if used, are removed and the concentration of toner particles is accomplished. If a diluting nonpolar liquid is also added, the ionic or zwitterionic compound can be added prior to, concurrently with, or subsequent thereto. If an adjuvant compound of a type described above has not been previously added in the preparation of the developer, it can be added prior to or subsequent to the developer being charged. Preferably the adjuvant compound is added after the dispersing step.

INDUSTRIAL APPLICABILITY

The electrostatic liquid developers of this invention demonstrate good image quality. The developers of this invention are useful in copying, e.g., making office copies of black and white as well as various colors; or color proofing, e.g., a reproduction of an image using the standard colors: yellow, cyan, magenta together with black as desired. In copying and proofing the toner particles are applied to a latent electrostatic image.

Other uses are envisioned for the electrostatic liquid developers include: digital color proofing, highlight color, lithographic printing plates, and resists.

A major advance in the art is that the resin particles contained in the developers of this invention are biodegradable (see, for example, H. V. Maulding, et al., Journal of Controlled Release, Vol. 3, Nos. 2-3, p. 103-117 (1986)) and more importantly degradable by hydrolysis, which removes the ink and breaks down the resin to units that can be isolated easily and reconverted to polymeric resin. Paper printed with these developers can be processed by standard paper recycle treatment without leaving a gray or spotted discoloration to the recycled paper made therefrom.

EXAMPLES

The following Examples illustrate but do not limit the invention. The percentages are by weight. Weight average molecular weight is determined by gel permeation chromatography (GPC). Conductivity is measured in picomhos (pmho)/cm at 5 hertz and low voltage, 5 volts.

For determining the recyclability and the nature of recyclable paper made from paper printed with the liquid developer of the present invention, the following test procedure, which is consistent with TAPPI Standards, may be used:

1. Cut 100 grams printed paper into 0.25 inch (6.35 mm) squares.
   Re-pulp in lab re-pulper, in the presence of bleach liquor for 30 minutes, at 50° C.
   Bleach liquor
   * 95% liquor
   * 5% paper by weight
   * 1 gram NaOH by weight on paper
   * 3 grams sodium silicate by weight on paper
   * 1 gram calcium carbonate
   * trace fatty acid soaps
   * 2 liters deionized water
2. Digest for 1 hour at 40° C., without agitation.
3. Isolate paper via course screening, flotation and washing.
4. Prepare 3 grams handsheets - for TAPPI Diano S-4 or TB1C.
5. Measure brightness and dirt count
   Obtain ISO and GE brightness measurements, as well as L*,a*,b* color readings.

EXAMPLE 1

A black developer was prepared by adding 6.63 g of polylactic acid, 1.66 grams Monarch 1000 black pigment, Cabot Corp., Billerica, Mass., and 33.2 grams of Isopar ®-L to a Union Process 01 Attritor, Union Process Company, Akron, Ohio charged with 0.1875 inch (4.76 mm) diameter carbon steel balls. The polylactic acid was prepared from a 90/10 ratio of L/D,L lactide via melt polymerization using $SnCl_2$ catalyst, weight average molecular weight 237,000, polydispersity 2.8 (Size Exclusion Chromatography vs. polystyrene standard), melting point 150° C., glass transition temperature of about 50° C. The mixture was milled at 165° C. for 1 hour then cooled to ambient temperature and the mixture was milled for 26 hours. The average particle size was 5.1 μm measured with a Malvern 3600E Particle Sizer. The developer was diluted to 0.5% solids with Isopar ®-L and charged up to 100 mg/g developer solids with 10% Basic Barium Petronate ®, Witco Corp., New York, N.Y., in Isopar ®-L The mobility of the toner was $8.5 \times 10^{-10} m^2/V$-Sec., as measured on a Matec ESA device (Matec Corp., Hopkinton, Mass.). Image quality was determined using a Savin 870 copier at standard mode: charging corona set at 6.8 Kv and transfer corona set at 8.0 Kv. An image was obtained that had clear definition.

EXAMPLE 2

Two samples of developed Xerox 4024 copier paper were prepared using the developer prepared as described in Example 1 and a control liquid developer made from a non-degradable resin. The control developer is composed of 20% Monarch 1000 black pigment and 80% ethylene (90%)/methacrylic acid (10%) copolymer, melt index at 190° C. is 500, acid no. is 54 and prepared by the procedure described in Example 5 of Blair et al., U.S. Pat. No. 4,923,778. The developer of Example 1 contains 20% Monarch 1000 black pigment, Cabot Corp., Billerica, Mass., and 80% degradable resin. Multiple sheet samples were prepared by applying as a thin film by a drawdown technique each developer to paper base stock. Coverage of the base stock by the toner film was typically about 40-50% for each sheet. The samples, including uninked base stock, were evaluated for ease of de-inking as follows:

Fifty grams, bone dry, of the sample was de-inked in a standard laboratory re-pulper at 3.0% consistency in a cooking liquor of deionized water that contained 0.5% $H_2O_2$, 1.0% NaOH, 0.3% sodium salt of diethylene triamine penta acetic acid, 3.0% sodium silicate, 0.25% Triton ® X-100, Rohm & Haas, Philadelphia, Pa.; all percentages based on dry weight of paper. De-inking was carried out at 105° F. (40° C.) for 20 minutes with agitation in the re-pulper, then an additional 40 minutes without agitation.

After re-pulping and cooking each sample was split in half and ink particles removed by either:
A. one-pass side-hill washing by methods known to those experienced in the art, or
B. flotation of the cooked pulp, by methods known to those experienced in the art, to foam out ink particles; followed by one-pass side-hill washing for further removal of ink.

Handsheets were made by TAPPI standard method T-218 and brightness measured by a Technidyne TC-1C to give the following results.

| Sample | Brightness (ISO) | Ink Count (1 inch sq) |
|---|---|---|
| uninked basestock | 86.5 | 2-4 fine spots |
| Control developer, A - wash only | 61.3 | very many large spots, including 1-2 mm flecks |
| Control developer, B - float and wash | 78.4 | many large spots, including 1 mm flecks |
| Ex. 1 developer, A - wash only | 75.5 | very many fine spots |
| Ex. 1 developer, B - float and wash | 85.3 | 20-30 fine spots |

This example demonstrates the superior de-inking properties of the toner prepared with degradable resin when image content consists of large solid areas.

EXAMPLE 3

Developer Preparation

A control black developer was prepared by adding the following ingredients to a Union Process 1S attritor:

| Ingredient | Amount (grams) |
|---|---|
| Ethylene (90)/methacrylic acid (10) copolymer, melt index at 190° C. is 500, acid number is 54 | 228 |
| Sterling ® NS Carbon Black | 55.8 |
| Heliogen ® Blue NBD 7010 pigment | 1.2 |
| Aluminum Stearate, #22, Witco Corp. | 15.0 |
| Isopar ® L, Exxon Corp. | 1210 |

The ingredients were heated to 95° C., milled for one hour, then cooled to ambient temperature. 800 grams of Isopar ®L were then added to the attritor, and the mixture was milled an additional 6 hours. The average particle size was 6.5 μm measured with a Malvern 3600E Particle Sizer. The toner was diluted to 1.5% solids with Isopar ®L, and charged with Basic Barium Petronate ®, Witco Corp. to a final conductivity of 15 pmho/cm.

The composition of the developer of the invention was identical to that of the control, except that the polylactic acid polymer described in Example 1 was substituted for the ethylene/methacrylic acid copolymer. The mixture was milled in a Union Process 01 attritor at 175° C. for one hour and was cooled to ambient temperature and ground for an additional 16 hours. The average particle size was 6.5 μm measured with a Malvern 3600E Particle Sizer. The toner was diluted to 1.5% solids with Isopar ®L, and charged with Basic Barium Petronate ® to a final conductivity of 15 pmho/cm.

Samples were multiple sheets of Xerox 4024 paper base stock to which either the control or liquid developer of the invention had been applied using a Fuji-Xerox 1005 copier modified to print liquid developer. The imaged copy was multiline text typical of a normal business letter. Optical density of the control and copies of the invention was measured to be 1.15±0.05. The samples were evaluated for de-inking as follows:

De-inking

Fifty grams, bone dry, of each sample was de-inked in a standard laboratory re-pulper at 3.0% consistency in a cooking liquor of deionized water that contained 0.5% $H_2O_2$, 1.0% NaOH, 0.3% sodium salt of diethylene triamine penta acetic acid, 3.0% sodium silicate, 0.25% Triton ®X-100, Rohm & Haas, Philadelphia, Pa.; all percentages based on dry weight of paper. De-inking was carried out at 105° F. (40° C.) for 20 minutes with agitation in the re-pulper, then an additional 40 minutes without agitation.

After re-pulping and cooking each sample was divided into three equal portions and the ink particles removed by either:
A. one-pass side-hill washing by methods known to those experienced in the art, or
B. three-pass side-hill washing
C. flotation of the cooked pulp, by methods known to those experienced in the art, to foam out ink particles; followed by three-pass side-hill washing for further removal of ink.

Handsheets were made by TAPPI standard method T-218 and brightness measured by taking eight readings on a Technidyne TC-1 to give the following results:

| SAMPLE | BRIGHTNESS (ISO) avg. | std. dev. | APPEARANCE (ink spots/50 sq. in.) fine | large |
|---|---|---|---|---|
| 1-pass wash | | | | |
| Invention | 85.5 | 0.19 | v. many | few |
| Control | 84.5 | 0.37 | vv. many | many |
| 3-pass wash | | | | |
| Invention | 87.6 | 0.19 | many | few |
| Control | 87.1 | 0.08 | v. many | many |
| float & 3-pass wash | | | | |
| Invention | 89.8 | 0.09 | v. few | v. few |
| Control | 88.8 | 0.09 | few | v. few |

This example demonstrates the superior de-inking properties of the toner prepared with degradable resin when image content consists of standard text.

We claim:

1. An electrostatic liquid developer having improved degradability compatible with recycling of printed paper consisting essentially of
   (A) a nonpolar liquid having a Kauri-butanol value of less than 30, present in a major amount,
   (B) particles of a degradable polymeric resin containing at least one hydroxy acid unit selected from the group consisting of
     (1) $(O(CR^1R^2)_nCO)_p$
     (2) $(OCR^1R^2COOCR^1R^2CO)_q$
     (3) $(OCR^1R^2CR^1R^2OCR^1R^2CO)_r$ and
     (4) $(OCR^1R^2CR^1R^2OCR^1R^2CR^1R^2CO)_s$
   wherein n is a whole number 2, 4 or 5, the total of p, q, r and s being 15 to 5,000, and $R^1$ or $R^2$, which can be the same or different, is hydrogen, hydrocarbyl containing 1 to 12 carbon atoms, or substituted hydrocarbyl containing 1 to 12 carbon atoms, the resin particles having an average by area particle size of less than 10 μm, and
   (C) a nonpolar liquid soluble ionic or zwitterionic charge director compound.

2. An electrostatic liquid developer according to claim 1 wherein the polymeric resin contains polylactic acid units.

3. An electrostatic liquid developer according to claim 1 wherein $R^1$ and $R^2$ each is hydrogen or methyl.

4. An electrostatic liquid developer according to claim 1 wherein the degradable resin is selected from the group consisting of homopolymer of any of units (1) to (4), block or random copolymers of at least two units of (1) to (4), blends of homopolymers of any of units (1) to (4), block or random copolymers of at least two units of (1) to (4), and combinations thereof.

5. An electrostatic liquid developer according to claim 1 wherein the degradable polymeric resin is at least one unit selected from the group consisting of epsilon-caprolactone, gamma-volerolactone, lactide(3,6-dimethyl-1,4-dioxan-2,5-dione), glycolid(1,4-dioxan-2,5dioxan-2,5-dione), 1,5-dioxepan-2-one, 1,4-dioxan-2-one, beta-butyrolactone, and beta-propiolactone.

6. An electrostatic liquid developer according to claim 1 wherein the particles have dispersed therein up to about 60% by weight of a colorant based on the total weight of developer solids.

7. An electrostatic liquid developer according to claim 6 wherein the colorant is a pigment.

8. An electrostatic liquid developer according to claim 6 wherein the colorant is a dye.

9. An electrostatic liquid developer according to claim 6 wherein an additional compound is present which is an adjuvant selected from the group consisting of polyhydroxy compound, aminoalcohol, polybutylene succinimide, metallic soap, and an aromatic hydrocarbon having a Kauri-butanol value of greater than 30.

10. An electrostatic liquid developer according to claim 1 wherein a fine particle size oxide is present.

11. An electrostatic liquid developer according to claim 1 wherein an additional compound is present which is an adjuvant selected from the group consisting of polyhydroxy compound, aminoalcohol, polybutylene succinimide, metallic soap, and an aromatic hydrocarbon having a Kauri-butanol value of greater than 30.

12. An electrostatic liquid developer according to claim 11 wherein a polyhydroxy adjuvant compound is present.

13. An electrostatic liquid developer according to claim 11 wherein an aminoalcohol adjuvant compound is present.

14. An electrostatic liquid developer according to claim 11 wherein a polybutylene succinimide adjuvant compound is present.

15. An electrostatic liquid developer according to claim 11 wherein an aromatic hydrocarbon adjuvant compound having a Kauri-butanol value of greater than 30 is present.

16. An electrostatic liquid developer according to claim 11 wherein a metallic soap adjuvant compound is present dispersed in the resin particles.

17. An electrostatic liquid developer according to claim 1 wherein the particles have an average by area particle size of less than 5 $\mu$m.

18. An electrostatic liquid developer according to claim 1 wherein component (C) is an oil-soluble petroleum sulfonate.

19. An electrostatic liquid developer according to claim 1 wherein component (C) is a sodium salt of phosphated mono- and diglycerides with unsaturated or saturated acid substituents.

20. An electrostatic liquid developer according to claim 1 wherein component (A) is present in 50 to 99.9% by weight, based on the total weight of liquid developer, the total weight of developer solids is 0.1 to 50% by weight, and component (C) is present in an amount of 0.25 to 1,500 mg/g developer solids.

21. An electrostatic liquid developer according to claim 1 wherein the resin particles have a plurality of fibers integrally extending therefrom.

22. A process according to claim 21 wherein cooling the dispersion is accomplished with stirring to form a viscous mixture and grinding by means of particulate media with or without the presence of additional liquid.

23. A process for the preparation of toner particles for electrostatic liquid developers comprising
   A. dispersing at an elevated temperature in a vessel a degradable polymeric resin containing at least one hydroxy acid unit selected from the group consisting of
   (1) $(O(CR^1R^2)_nCO)_p$
   (2) $(OCR^1R^2COOCR^1R^2CO)_q$
   (3) $(OCR^1R^2CR^1R^2OCR^1R^2CO)_r$ and
   (4) $(OCR^1R^2CR^1R^2OCR^1R^2CR^1R^2CO)_s$
   wherein n is a whole number 2, 4 or 5, the total of p, q, r and s being 15 to 5,000, and $R^1$ or $R^2$, which can be the same or different, is hydrogen, hydrocarbyl containing 1 to 12 carbon atoms, or substituted hydrocarbyl containing 1 to 12 carbon atoms, and, a nonpolar liquid having a Kauri-butanol value of less than 30, by means of moving particulate media whereby the moving particulate media creates shear and/or impact, while maintaining the temperature in the vessel at a temperature sufficient to plasticize and liquify the resin and below that at which the nonpolar liquid boils and the resin decomposes, B. cooling the dispersion in said vessel to permit precipitation of the resin out of the dispersant, the particulate media being maintained in continuous movement during and subsequent to cooling whereby toner particles having an average by area particle size of less than 10 $\mu$m are formed, and C. separating the dispersion of toner particles from the particulate media.

24. A process according to claim 23 wherein there is present in the vessel up to 100% by weight of a polar additive having a Kauri-butanol value of at least 30, the percentage based on the total weight of the liquid.

25. A process according to claim 24 wherein the particulate media are selected from the group consisting of stainless steel, carbon steel, ceramic, alumina, zirconia, silica and sillimanite.

26. A process according to claim 23 wherein the particulate media are selected from the group consisting of stainless steel, carbon steel, ceramic, alumina, zirconia, silica and sillimanite.

27. A process according to claim 23 wherein at least one colorant is present in dispersing step (A), and the temperature is maintained in the vessel at a temperature sufficient to plasticize and liquify the resin and below that at which the dispersant nonpolar liquid degrades and the resin and colorant decomposes.

28. A process according to claim 27 wherein a charge director compound is added during or subsequent to Step (A).

29. A process according to claim 28 wherein the charge director compound is an oil-soluble petroleum sulfonate.

30. A process according to claim 28 wherein the charge director is a sodium salt of phosphated mono- and diglycerides with unsaturated or saturated acid substituents.

31. A process according to claim 23 wherein cooling the dispersion is accomplished while grinding by means of particulate media to prevent the formation of a gel or solid mass with or without the presence of additional liquid.

32. A process according to claim 23 wherein cooling the dispersion is accomplished without stirring to form a gel or solid mass, followed by shredding the gel or solid mass and grinding by means of particulate media with or without the presence of additional liquid.

33. A process according to claim 23 wherein a charge director compound is added during or subsequent to Step (A).

34. A process according to claim 33 wherein the charge director compound is an oil-soluble petroleum sulfonate.

35. A process according to claim 33 wherein the charge director is a sodium salt of phosphated mono- and diglycerides with unsaturated or saturated acid substituents.

36. A process according to claim 23 wherein additional dispersant nonpolar liquid, polar liquid, or combinations thereof is present to reduce the concentration of toner particles to between 0.1 to 50 percent by weight with respect to the developer liquid.

37. A process according to claim 36 wherein the concentration of toner particles is reduced by additional dispersant nonpolar liquid.

38. A process according to claim 23 wherein an adjuvant compound selected from the group consisting of polyhydroxy compound, aminoalcohol, polybutylene succinimide, metallic soap, and an aromatic hydrocarbon having a Kauri-butanol value of greater than 30 is added during dispersing step (A).

39. A process for preparing an electrostatic liquid developer for electrostatic imaging comprising
  A. dispersing at an elevated temperature in a vessel a degradable polymeric resin containing at least one hydroxy acid unit selected from the group consisting of
    (1) $(O(CR^1R^2)_nCO)_p$
    (2) $(OCR^1R^2COOCR^1R^2CO)_q$
    (3) $(OCR^1R^2CR^1R^2OCR^1R^2CO)_r$ and
    (4) $(OCR^1R^2CR^1R^2OCR^1R^2CR^1R^2CO)_s$
    wherein n is a whole number 2, 4 or 5, the total of p, q, r and s being 15 to 5,000, and $R^1$ or $R^2$, which can be the same or different, is hydrogen, hydrocarbyl containing 1 to 12 carbon atoms, or substituted hydrocarbyl containing 1 to 12 carbon atoms,
    and, a nonpolar liquid having a Kauri-butanol value of less than 30, by means of moving particulate media whereby the moving particulate media creates shear and/or impact, while maintaining the temperature in the vessel at a temperature sufficient to plasticize and liquify the resin and below that at which the nonpolar liquid boils and the resin decomposes,
  (B) cooling the dispersion, either
    (1) without stirring to form a gel or solid mass, followed by shredding the gel or solid mass and grinding by means of particulate media with or without the presence of additional liquid;
    (2) with stirring to form a viscous mixture and grinding by means of particulate media with or without the presence of additional liquid; or
    (3) while grinding by means of particulate media to prevent the formation of a gel or solid mass with or without the presence of additional liquid;
  (C) separating the dispersion of toner particles having an average by area particle size of less than 10 μm from the particulate media, and
  (D) adding during or subsequent to Step (A) a nonpolar liquid soluble ionic or zwitterionic charge director compound.

* * * * *